United States Patent [19]

Taylor et al.

[11] 4,304,710

[45] Dec. 8, 1981

[54] SYNTHETIC THERMOPLASTIC MOULDING MATERIALS

[75] Inventors: Kenneth J. Taylor, Rochdale; Allan Lord, Littleborough, both of England

[73] Assignee: TBA Industrial Products Limited, Manchester, England

[21] Appl. No.: 42,336

[22] Filed: May 25, 1979

Related U.S. Application Data

[63] Continuation-in-part of Ser. No. 915,666, Jun. 15, 1978, abandoned, which is a continuation of Ser. No. 708,097, Jul. 23, 1976, abandoned.

[30] Foreign Application Priority Data

Jul. 26, 1975 [GB] United Kingdom ............... 31366/75

[51] Int. Cl.³ .................................................. C08K 9/06
[52] U.S. Cl. .............................. 260/42.15; 260/42.18; 260/42.43; 260/42.44; 260/42.45; 260/42.46; 260/42.47
[58] Field of Search ............... 260/42.18, 42.15, 42.44, 260/42.45, 42.46, 42.47, 42.43

[56] References Cited

U.S. PATENT DOCUMENTS 4,125,514 11/1978 Stabler ............................ 260/42.18

FOREIGN PATENT DOCUMENTS 2633501 2/1977 Fed. Rep. of Germany .

*Primary Examiner*—Lewis T. Jacobs
*Attorney, Agent, or Firm*—Cushman, Darby & Cushman

[57] ABSTRACT

A thermoplastic moulding material comprising (a) a synthetic thermoplastic polymer having a backbone comprising at least 50% of carbon atoms and selected from polypropylene, polyethylene, polystyrene, styrene/acrylonitrile copolymers, polyester, polyamides, ABS copolymers and acetal copolymers (b) from 0.05 to 10 percent by weight, based on the total weight of material, of polyimide pre-polymer (c) a reinforcing agent selected from glass fiber and mica.

25 Claims, No Drawings

SYNTHETIC THERMOPLASTIC MOULDING MATERIALS

CROSS-REFERENCE TO RELATED APPLICATIONS

This application is a continuation-in-part of our earlier application Ser. No. 915,666 filed June 15, 1978 which, in turn, is a continuation of our earlier application Ser. No. 708,097 filed July 23, 1976, both of said applications now being abandoned.

This invention concerns improvements in or relating to synthetic thermoplastic moulding materials.

According to the present invention, a thermoplastic moulding material comprises (a) a synthetic thermoplastic polymer having a backbone comprising at least 50% of carbon atoms selected from polypropylene, polyethylene, polystyrene, styrene/acrylonitrile copolymers, polyesters, polyamides, ABS copolymers and acetal copolymers (b) from 0.05 to 10 percent by weight, based on the total weight of the moulding material; of a polyimide pre-polymer (as hereinafter defined) and (c) a reinforcing agent selected from glass fibre and mica.

By polyimide pre-polymer in this specification is meant a prepolymer which is the reaction product of a polyamine and a bis-imide of an unsaturated carboxylic acid and which is capable of reacting further to give a thermoset resin. Polyimides of this type are described in UK Pat. Nos. 1,190,718; 1,355,401, 1,355,402; 1,355,403; 1,355,405; 1,355,406 and 1,355,407.

It is preferred that the polyimide pre-polymer is the reaction product of a primary diamine containing not more than 30 carbon atoms and an N,N¹ bis imide of general formula

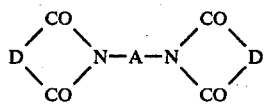

in which D represents a divalent radical containing a carbon-carbon double bond, and A is a divalent radical containing at least two carbon atoms.

Preferably the primary diamine is an aromatic compound, e.g. containing phenylene groups such as the compound of formula

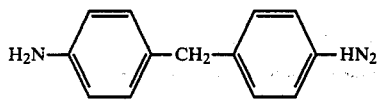

Preferably the N,N¹ bis-imide is derived from an α,β unsaturated dicarboxylic acid such as maleic acid. The radical A is preferably an aromatic radical such as

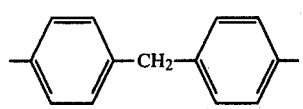

The number average molecular weight of the prepolymer is preferably no more than 5000.

If desired the prepolymer may also contain an additional component derived from either a heat polymerizable unsaturated monomer as described in UK Pat. No. 1,355,401.

We have found that the inclusion of a polyimide prepolymer, within the range of content specified above, in a thermoplastic polymer incorporating a fibrous reinforcing agent and/or particulate filler, provides a surprising improvement in such mechanical properties as, for example, tensile strength and/or modulus, flexural strength and/or modulus, and/or impact strength.

The polyimide pre-polymer preferably is present in an amount within the range from 0.2 to 2 percent by weight of the moulding material. The thermoplastic polymer, which constitutes from 35 to about 95% by weight of the moulding material, preferably is polyethylene, polypropylene, polystyrene, or a styrene-acrylonitrile copolymer, most preferably polypropylene. The preferred reinforcing agent is glass fibre, preferably one dressed with a surface treatment agent, more preferably one dressed with an organosilane. The glass fibre or mica may be mixed with another reinforcing agent, either fibrous or a particulate filler such as talc, and the reinforcing agent may be present in a total amount within the range from 5 to 55 percent by weight of the material.

The thermoplastic moulding material of this invention may be mixed in a compounding extruder, for example by feeding a mixture of thermoplastic polymer and polyimide prepolymer to the extruder and feeding the glass separately into the extruder, extruding the resulting mix and, for example, pelletizing it for subsequent moulding. The temperatures of the extruder barrel zones may be the usual temperatures for compounding the particular thermoplastic polymer being used.

Alternatively the material of the invention may be mixed in situ, for example at the injection moulding machine itself, by separately feeding the polyimide prepolymer, and a glass/thermoplastic polymer compound to the feed screw of the injection machine.

It is to be noted that when using the expression "moulding material" in relation to the thermoplastic material of this invention we mean a material which is to be meltprocessed by any of the usual techniques including not only injection and transfer moulding but also extrusion and the like.

Thus in one aspect our invention includes high modulus thermoplastic moulding materials consisting essentially of (a) from about 59.6 to about 89.5 percent by weight, based on the total weight of the material, of synthetic thermoplastic polymer having a backbone of at least 50 percent of carbon atoms and selected from the group consisting of polypropylene, polyethylene, polystyrene, copolymers of styrene and acrylonitrile or their mixtures; (b) from about 0.2 to about 7.5 percent by weight, based on the total weight of material, of the reaction product consisting of a primary diamine of the formula:

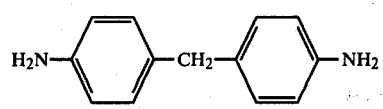

and an N,N¹ bis-imide of the formula:

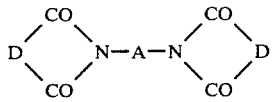

in which D is a divalent radical containing a carbon-carbon double bond, and A is a divalent radical containing at least two carbon atoms; and (c) from about 9.5 to about 37.9 percent by weight, based on the total weight of the material, of a reinforcing agent selected from the group consisting of glass fiber and mica.

Our invention also includes thermoplastic moulding materials consisting essentially of: (a) from about 59.6 to about 89.5 percent by weight, based on the total weight of the material, of a synthetic thermoplastic polymer having a backbone comprising at least 50% of carbon atoms and selected from the group consisting of polypropylene, polyethylene, polystyrene, styrene/acrylonitrile copolymers, ABS, copolymers and their mixtures; (b) from about 0.2 to about 7.5 percent by weight, based on the total weight of material, of a polyimide prepolymer which is the reaction product consisting of a polyamine and a bis-imide of an unsaturated carboxylic acid; and (c) from about 9.5 to about 37.9 percent by weight, based on the total weight of material, of a reinforcing agent selected from the group consisting of glass fiber and mica.

EXAMPLE 1 (Comparative)

A. 25 parts of a fibrous glass dressed with polyurethane and aminosilane (commercially available from TBA Industrial Products Limited) were compounded with 75 parts of polypropylene in a Reifenhauser extruder, at barrel temperatures of: 175° C., 185° C., 195° C., 200° C., 200° C., 215° C. (die) and the resultant moulding material was moulded to form test specimens. The results of mechanical tests effected on the specimens are shown in Table I.

B. 30 parts of a fibrous glass dressed with polybutene and aminosilane (commercially available from TBA Industrial Products Limited) were compounded with 70 parts of polypropylene in a twin-screw extruder at barrel temperatures of: 200° C., 160° C., 160° C., 190° C. (die) and the resultant moulding material was moulded and the specimens tested as in A above, the results being given in Table I.

TABLE I

|  | Example | | | |
|---|---|---|---|---|
|  | 1A | 1B | 2A | 2B |
| Tensile strength (MPa) | 38 | 56 | 78 | 73 |
| Flexural strength (MPa) | 64 | 75 | 107 | 99 |
| Flexural modulus (GPa) | 4.3 | 5.0 | 4.6 | 4.8 |
| Notched Izod Impact strength (J/m) | 75 | 54 | 100 | 65 |
| Notched Charpy Impact strength (KJ/m$^2$) | 5.8 | 4.6 | 7.2 | 5.0 |
| Un-notched Charpy Impact strength (KJ/m$^2$) | 14.4 | 9.6 | 18.7 | 13.8 |

EXAMPLE 2

A. Example 1A was repeated, 7.5 parts of the polypropylene being replaced by 7.5 parts of a proprietory polyimide prepolymer derived from derived from an aromatic diamine and a bis-maleimide commercially available from Rhone Poulenc under the name "KERIMID 601".

B. Example 1B was repeated, 0.2 parts of the polypropylene being replaced by 0.2 parts of the polyimide prepolymer "KERIMID 601".

The results of the tests effected on these materials are also given in Table I.

Comparison of the test results of Example 1A with those of Example 2A and of 1B with 2B shows that a significant improvement in all the properties listed is obtained.

EXAMPLES 3 to 5

Thermoplastic compositions based on styrene-acrylonitrile copolymer, polystyrene and polyethylene were produced by the same general method as described in Examples 1A and 2A except that temperatures appropriate for compounding the different polymers were used and in the case of the styrene-acrylonitrile copolymer the twin-screw extruder was used. The compositions and the properties of mouldings made therefrom being set out in Table II hereafter. Comparison of the properties of the B and C compositions with the respective composition A shows the improvements attained by incorporation of the polyimide prepolymer.

TABLE II

| PROPERTY | GLASS REINFORCED S.A.N. | | | GLASS REINFORCED POLYSTRENE | | | GLASS REINFORCED POLYETHYLENE | | |
|---|---|---|---|---|---|---|---|---|---|
| Example | 3A | 3B | 3C | 4A | 4B | 4C | 5A | 5B | 5C |
| % By Wt Kerimid 601' in Polymer | None | 5 | 3 | None | 5.7 | 2.8 | None | 5.7 | 2.8 |
| Glass Content % By Wt. | 34.4 | 34.8 | 32.0 | 26.8 | 28.3 | 28.0 | 28.0 | 29.8 | 29.7 |
| Tensile Strength MPa | 107 ± 7 | 126 ± 10 | 127 ± 2 | 70 ± 5 | 100 ± 5 | 104 ± 4 | 34 ± 2 | 71 ± 1 | 68 ± 2 |
| Tensile Modulus GPa | 12.0 ± 0.4 | 12.2 ± 0.2 | 11.2 ± 0.2 | 7.9 ± 0.3 | 9.9 ± 0.8 | 9.5 ± 0.4 | 5.7 ± 0.3 | 5.6 ± 0.1 | 5.6 ± 0.3 |
| Flexural Strength MPa | 154 ± 9 | 177 ± 10 | 176 ± 9 | 99 ± 1 | 141 ± 8 | 136 ± 8 | 41 ± 1 | 82 ± 3 | 81 ± 3 |
| Flexural Modulus GPa | 10.1 ± 0.1 | 10.0 ± 0.1 | 9.3 ± 0.2 | 7.2 ± 0.4 | 8.0 ± 0.1 | 7.7 ± 0.2 | 4.3 ± 0.2 | 4.3 ± 0.1 | 4.0 ± 0.1 |
| Izod Impact Strength J/m | 46 ± 3 | 67 ± 1 | 60 ± 4 | 63 ± 3 | 76 ± 3 | 81 ± 4 | 93 ± 3 | 232 ± 12 | 229 ± 11 |
| Unnotched Charpy Impact Strength KJ/m$^2$ | 9.8 ± 1.7 | 14.4 ± 1.7 | 13.9 ± 1.7 | 5.9 ± 0.3 | 13.4 ± 0.7 | 13.5 ± 1.0 | 109 ± 2.4 | 29.3 ± 3.7 | 29.6 ± 1.4 |
| Notched Charpy Impact Strength | 4.2 ± 0.2 | 5.7 ± 0.75 | 5.2 ± 0.5 | 4.6 ± 0.4 | 6.4 ± 0.6 | 5.8 ± 0.7 | 7.9 ± 0.4 | 13.3 ± 2.3 | 15.5 ± 1.5 |

TABLE II-continued

| PROPERTY | GLASS REINFORCED S.A.N. | | | GLASS REINFORCED POLYSTRENE | | | GLASS REINFORCED POLYETHYLENE | | |
|---|---|---|---|---|---|---|---|---|---|
| Example | 3A | 3B | 3C | 4A | 4B | 4C | 5A | 5B | 5C |
| KJ/m² | | | | | | | | | |
| Specific Gravity | 1.35 ± 0.01 | 1.36 ± 0.01 | 1.34 ± 0.03 | 1.25 ± 0.01 | 1.27 ± 0.01 | 1.26 ± 0.01 | 1.16 ± 0.01 | 1.19 ± 0.01 | 1.18 ± 0.01 |

EXAMPLES 6 to 10

Thermoplastic compositions based on polypropylene were produced by the general method described in Example 1A varying the amount of glass used as reinforcement, and in the case of Example 10 replacing some of the glass of 1B by talc. In each case a control sample not containing the polyimide prepolymer was made and tested, as in Example 1. The glass was similar to that used in Example 1A except in the case of Example 10 where the glass was the same as that used in Example 1B.

The compositions and properties of the mouldings made therefrom are set out in Table III hereinafter.

EXAMPLES 11 to 15

Thermoplastic compositions containing the polyimide prepolymer "Kerimid 601" were produced by the same general method as in Example 1A except that different combinations of polymer and reinforcing agent were used with temperatures being adjusted according to the polymer being used. In Example 11 the polymer was nylon 6, the reinforcing agent glass, in Example 12 the combination was acetal/glass, in Example 13 the combination was poly (butylene terephthalate)/glass, in Example 14 an ABS copolymer was used with glass and in Example 15 polypropylene was used with mica. In each case a control sample not con-

TABLE III

| | Polymer Polypropylene Examples | | | | | | | | | |
|---|---|---|---|---|---|---|---|---|---|---|
| | 6 | | 7 | | 8 | | 9 | | 10 | |
| | Filler | | | | | | | | | |
| | 9.5% glass | 9.5% glass | 19.7% glass | 18.8% glass | 27.5% glass | 27.4% glass | 37.5% glass | 37.9% glass | 25% glass 15% talc | glass |
| | Kerimid 601 level % | | | | | | | | | |
| Property | — | 1.0 | — | 1.0 | — | 1.0 | — | 1.0 | — | 0.4 |
| S.G. | 0.97 | 0.97 | 1.04 | 1.03 | 1.10 | 1.08 | 1.16 | 1.20 | 1.25 | 1.24 |
| Tensile Strength (MPa) | 43 | 57 | 47 | 77 | 48 | 91 | 44 | 103 | 44 | 71 |
| Tensile modulus (GPa) | 3.1 | 3.0 | 4.5 | 4.6 | 5.9 | 6.6 | 7.2 | 8.7 | 6.3 | 6.7 |
| Flexural Strength (MPa) | 57 | 78 | 63 | 107 | 64 | 125 | 68 | 144 | 67 | 115 |
| Flexural modulus (GPa) | 2.5 | 2.3 | 3.5 | 3.5 | 4.9 | 4.9 | 6.4 | 6.8 | 5.6 | 5.6 |
| Izod impact (J/m) | 79 | 82 | 95 | 123 | 90 | 163 | 59 | 173 | — | — |
| Unnotched charpy impact (KJ/m²) | 18.7 | 25 | 15.5 | 27.0 | 15.2 | 29.1 | 7.8 | 28.0 | 9.3 | 29.0 |
| Notched charpy impact (KJ/m²) | 5.8 | 5.6 | 6.8 | 8.9 | 6.7 | 10.2 | 5.0 | 11.0 | 5.6 | 11.0 |
| DTUL at 0.45 MPa (°C.) | 148 | 160 | 141 | 161 | 141 | 161 | 150 | 162 | 154 | 157 | taining the polyimide was made and tested and the glass was similar to that used in Example 1A.

The compositions and properties of the mouldings made therefrom are set out in Table IV hereinafter.

TABLE IV

| | Polymer | | | | | | | | | |
|---|---|---|---|---|---|---|---|---|---|---|
| | Nylon 6 | | Acetal | | Poly Butylene terephthalate | | ABS | | P/P | |
| | Example | | | | | | | | | |
| | 11 | | 12 | | 13 | | 14 | | 15 | |
| | Filler | | | | | | | | | |
| | 30% glass | 30% glass | 27.7% glass | 28.4% glass | 29.2% glass | 28.9% glass | 30% glass | 29.6% glass | 30% mica | 30% mica |
| | Kerimid 601" level % | | | | | | | | | |
| Property | — | 5.0 | — | 1.4 | — | 1.4 | — | 1.0 | — | 2.0 |
| S.G. | 1.34 | 1.35 | 1.56 | 1.61 | 1.52 | 1.52 | 1.29 | 1.27 | 1.10 | 1.14 |
| Tensile Strength (MPa) | 148 | 162 | 80 | 104 | 107 | 126 | 92 | 96 | 23 | 33 |
| Tensile modulus (GPa) | 9.2 | 10.6 | 8.8 | 9.3 | 8.9 | 9.3 | 8.6 | 8.4 | 3.5 | 6.2 |
| Flexural Strength (MPa) | 243 | 264 | 111 | 145 | 150 | 185 | 135 | 141 | 40 | 51 |
| Flexural modulus (GPa) | 7.8 | 8.9 | 7.0 | 7.7 | 7.7 | 7.5 | 7.4 | 6.9 | 4.2 | 5.6 |
| Izod impact (J/M) | 193 | 185 | 72 | 69 | 97 | 100 | 82 | 110 | | |
| Unnotched charpy impact (KJ/m²) | 55.6 | 55.7 | 11.6 | 15.6 | 22.2 | 26.9 | 13.2 | 13.8 | 5.5 | 4.5 |

TABLE IV-continued

| | Polymer | | | | | | | | | |
|---|---|---|---|---|---|---|---|---|---|---|
| | Nylon 6 | | Acetal | | Poly Butylene terephthalate | | ABS | | P/P | |
| | Example | | | | | | | | | |
| | 11 | | 12 | | 13 | | 14 | | 15 | |
| | Filler | | | | | | | | | |
| | 30% glass | 30% glass | 27.7% glass | 28.4% glass | 29.2% glass | 28.9% glass | 30% glass | 29.6% glass | 30% mica | 30% mica |
| | Kerimid 601" level % | | | | | | | | | |
| Property | — | 5.0 | — | 1.4 | — | 1.4 | — | 1.0 | — | 2.0 |
| Notched charpy impact (KJ/m$^2$) | 13.8 | 13.2 | 5.8 | 6.2 | 8.6 | 7.7 | 6.0 | 8.1 | 3.1 | 3.0 |
| DTUL at 0.45MPa (°C.) | — | — | — | — | — | — | — | — | 136 | 147 |

We claim:

1. A thermoplastic moulding material consisting essentialy of:
   (a) from 35 to 95 percent by weight, based on the total weight of the material, of a synthetic thermoplastic polymer having a backbone comprising at least 50% of carbon atoms and selected from the group consisting of polypropylene, polyethylene, polystyrene, styrene/acrylonitrile copolymers, ABS copolymers and mixtures thereof;
   (b) from 0.05 to 10 percent by weight, based on the total weight of material, of a polyimide prepolymer which is the reaction product consisting of a polyamine and a bis-imide of an unsaturated carboxylic acid; and
   (c) reinforcing agent present in a total amount within the range of from 5 to 55 percent by weight, based on the total weight of material, said reinforcing agent comprising glass fiber or mica as an essential ingredient, which essential ingredient is present in an amount up to about 37.9% based upon the total weight of the material.

2. A moulding material according to claim 1 in which the polyimide prepolymer comprises the reaction product of a primary diamine containing not more than 30 carbon atoms and an N,N$^1$ bis-imide of the formula

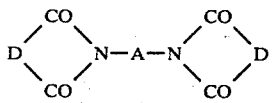

in which D represents a divalent radical containing a carbon-carbon double bond and A is a divalent radial containing at least two carbon atoms.

3. A moulding material according to claim 2 in which the primary diamine is an aromatic compound.

4. A moulding material according to claim 3 in which the primary diamine contains at least one phenylene group.

5. A moulding material according to claim 4 in which the primary diamine is the compound of the formula

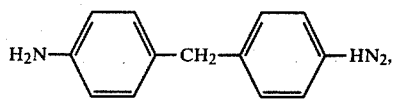

6. A moulding material according to claim 2 in which the radical D in the N,N$^1$ bis-imide is derived from an α,β-unsaturated dicarboxylic acid.

7. A moulding material according to claim 6 in which the radical D is derived from maleic acid.

8. A moulding material according to claim 2 in which the radical A in the N,N$^1$ bis-imide is an aromatic radical.

9. A moulding material according to claim 8 in which the aromatic radical contains at least one phenylene group.

10. A moulding material according to claim 9 in which the radical has the formula

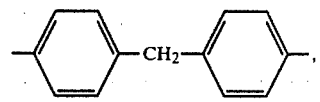

11. A moulding material according to claim 2 in which the molar ratio of bis-imide to polyamine is in the range 1.2:1 up to 50:1.

12. A moulding material according to claim 11 in which the molar ratio of bis-imide to polyamine is in the range 1.2:1 up to 2.9:1.

13. A moulding material according to claim 1 in which the amount of polyimide prepolymer is in the range from 0.2 to 2.0 percent by weight of the material.

14. A moulding material according to claim 1 in which the thermoplastic polymer has a backbone composed solely of carbon atoms.

15. A moulding material according to claim 14 in which the thermoplastic polymer is polypropylene.

16. A moulding material according to claim 14 in which the thermoplastic polymer is polyethylene.

17. A moulding material according to claim 14 in which the thermoplastic polymer is polystyrene.

18. A moulding material according to claim 1 in which the thermoplastic polymer is a styrene-acrylonitrile copolymer.

19. A moulding material according to claim 1 comprising a mixture of said thermoplastic polymers.

20. A moulding material according to claim 1 in which the reinforcing agent comprises a mixture of glass fibre with a further fibrous or particulate filler material.

21. A moulding material according to claim 20 in which the reinforcing agent comprises a mixture of glass fibre and talc.

22. A moulding material according to claim 1 in which the reinforcing agent consists solely of glass fibre.

23. A moulding material according to claim 1 in which the reinforcing agent comprises an organo-silane dressed glass fibre.

24. A high modulus thermoplastic moulding material consisting essentially of:
(a) from about 59.6 to about 89.5 percent by weight, based on the total weight of the material, of a synthetic thermoplastic polymer having a backbone of at least 50 percent of carbon atoms and selected from the group consisting of polypropylene, polyethylene, polystyrene, copolymers of styrene and acrylonitrile and mixtures thereof,
(b) from about 0.2 to about 7.5 percent by weight, based on the total weight of material, of the reaction product consisting of a primary diamine of the formula:

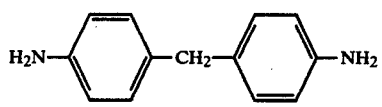

and an N,N¹ bis-imide of the formula:

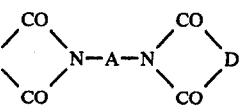

wherein D is a divalent radical containing a carbon-carbon double bond, and A is a divalent radical containing at least two carbon atoms and
(c) from about 9.5 to about 37.9 percent by weight, based on the total weight of the material, of a reinforcing agent selected from the group consisting of glass fiber and mica.

25. A thermoplastic moulding material consisting essentially of:
(a) from about 59.6 to about 89.5 percent by weight, based on the total weight of the material, of a synthetic thermoplastic polymer having a backbone comprising at least 50% of carbon atoms and selected from the group consisting of polypropylene, polyethylene, polystyrene, styrene/acrylonitrile copolymers, ABS copolymers and mixtures thereof,
(b) from about 0.2 to about 7.5 percent by weight, based on the total weight of material, of a polyimide prepolymer which is the reaction product consisting of a polyamine and a bis-imide of an unsaturated carboxylic acid and
(c) from about 9.5 to about 37.9 percent by weight, based on the total weight of material, of a reinforcing agent selected from the group consisting of glass fiber and mica.

* * * * *